April 13, 1965 H. W. McKENNA 3,178,689
TIMING DEVICE FOR A COMPUTING MACHINE
Filed Nov. 21, 1960
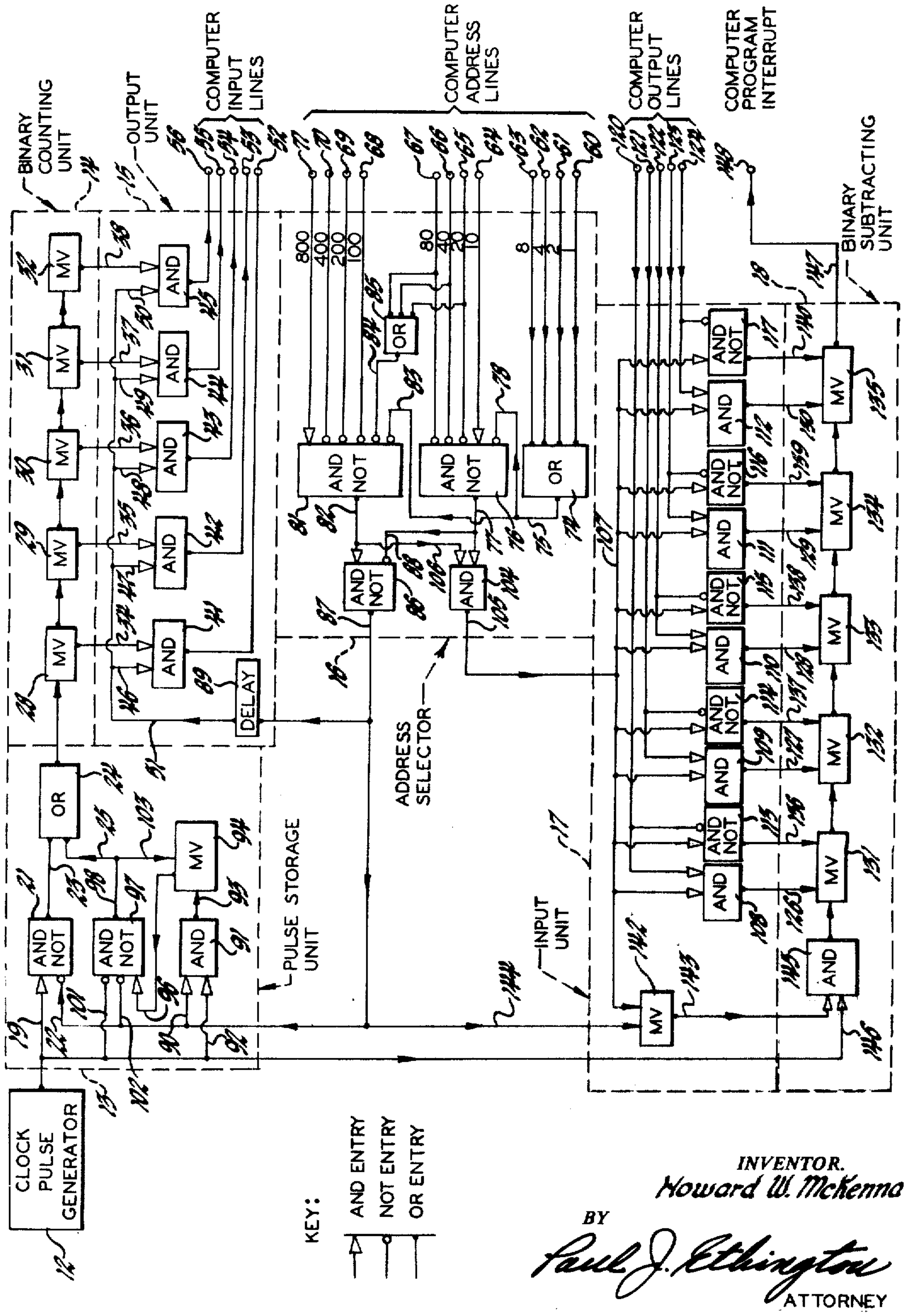
INVENTOR.
Howard W. McKenna
BY
Paul J. Ethington
ATTORNEY United States Patent Office 3,178,689
Patented Apr. 13, 1965

3,178,689
TIMING DEVICE FOR A COMPUTING MACHINE

Howard W. McKenna, Kokomo, Ind., assignor to General Motors Corporation, Detroit, Mich., a corporation of Delaware Filed Nov. 21, 1960, Ser. No. 70,812
7 Claims. (Cl. 340—172.5)

This invention relates to apparatus for entering stored information such as the time of day into a digital computing machine.

In order to provide information on the printed output of a computing machine concerning the time spent on a given program, it is necessary to provide some form of time information as an input to the computer. For example, at the beginning and at the end of each program, the current time of day could be printed so that the elapsed time of the program could be calculated. Also, if it is desired that the machine run on a given program for a specified time only, then it is necessary to provide apparatus for automatically halting the computation on the given program at the completion of the specified time and instructing the machine to proceed to the next program.

Apparatus for entering time of day into a parallel binary computing machine is disclosed and claimed in my copending application S.N. 713,673, filed February 6, 1958, now Patent No. 3,011,122, issued November 28, 1961, and assigned to the assignee of the present invention.

It is the the principal object of the present invention to provide improved apparatus for entering information such as current time to a computing machine. Another object is to provide information input apparatus for a computing machine that is addressable from the computing machine. A further object is to provide "on-line" time input apparatus that is addressable from the computing machine and is adapted to interrupt the program of the computing machine after a time interval specified by the computing machine program.

In accordance with the present invention, a clock pulse source is provided which produces pulses at selected time intervals. These pulses are accumulated in a register and the number present in this register may be fed into the input lines of a computing machine through an output unit. An address selector is utilized which is connected to the address lines of the computing machine and which is adapted to energize the output unit when the proper address appears on the computer address lines. When energized, this output unit is effective to enable the output unit to read the number accumulated in the counting unit into the computer. The address selector output also activates a pulse storage unit which is effective to store clock pulses occurring while the register is being read into the computer. Then, after the reading is complete, the storage unit feeds the stored pulse into the register. To obtain a program interrupt feature, a subtracting register is provided which is connected to the computer output through an input unit. The computer may be programmed to apply the desired running time to the computer output lines prior to the beginning of a program. At the same time, the input unit is energized from the address selector by applying a given address to the computer address lines, allowing desired running time to be entered into the subtracting register through the input unit. Subsequently, the clock pulses will drive the subtracting register and when the desired running time has been exceeded, the subtracting register will produce a program interrupt output. The program interrupt is applied to the computing machine and is effective to transfer the computing machine to an exit routine.

The novel features characteristic of the invention are set forth with particularity in the appended claims. The invention itself may best be understood by reference to the following description of one embodiment thereof, taken in conjunction with the accompanying drawing, in which:

The single figure is a block diagram of apparatus incorporating the principal features of the invention.

With reference to the drawing, there is shown a clock pulse generator 12 that is adapted to produce output pulses spaced at predetermined intervals, such as every one-thousandth of an hour. This generator may include a synchronous motor and a cam arrangement adapted to drive a microswitch. The clock pulses are applied through a pulse storage unit 13 to a binary counting unit 14 which is adapted to provide a parallel binary representation of the cumulative number of clock pulses. The binary counting unit 14 is connected through an output unit 15 to the parallel input lines of a computing machine such as an IBM 7090 electronic data processing machine. The parallel address lines of the computing machine are applied to an address selector 16 which, when the proper address appears on the address lines, is effective to energize the output or input units. The parallel output lines of the computing machine are applied to an input unit 17 which is effective, when energized from the address selector 16, to apply the complement of the number appearing on the computer output lines to a binary subtracting unit 18. The input of the subtracting unit is connected to the generator 12 to receive the clock pulses which are added to the complemented number already entered.

Referring to the single figure of the drawing in more detail, the clock pulses from the output of the generator 12 are applied to an input 19 of an "and-not" gate 21. The gate 21 is effective to produce an output when a voltage appears at the input 19 but no voltage appears at a second input 22. The output of the gate 21 is connected to an input 23 of an "or" gate 24 which is effective to produce an output when a voltage appears either at the input 23 or at a second input 25. Thus, if no voltage appears at the input 22, the clock pulse will appear at the output of the "or" gate 24 and thus will be applied to the input of a first counting stage 28 of the binary counting unit 14. The counting unit comprises a register of conventional design including a plurality of serially connected counting stages 28–32, each stage being composed of a bistable multivibrator or flip-flop circuit. These circuits are connected in cascade whereby the conductive conditions in the various counting stages will provide a parallel binary representation of the serial unitary clock pulse input. Utilizing only five counting stages as shown, and a clock pulse spacing of one-thousandth hour, the counting unit would be effective to accumulate pulses only up to a total of approximately two minutes. However, additional counting stages may be added folowing the stage 32 by employing additional bistable circuits. For example, if it is desired to accumulate up to a time interval of one hour, then ten stages would be adequate. If a twenty-four hour time interval is desired, then fifteen binary counting stages would be necessary.

The binary "1" output of each of the counting stages 28–32 is connected to one of a series of inputs 34–38 of a plurality of "and" gates 41–45 in the output unit 15. These "and" gates 41–45 are of conventional design and each is effective to produce an output only when a voltage appears at its respective input 34–38 and also an enabling voltage appears at a series of inputs 46–50. The inputs 46–50 are connected to a common line 51 so that when the line 51 is energized all of the gates 41–45 will be enabled and the binary representation appearing on the counting stages 28–32 will appear at a set of parallel terminals 52–56. These terminals are connected to the parallel input lines of the computer, the terminal 52 being connected in this instance to the lowest order input line.

The illustrative embodiment of the invention is adapted for use with a computing machine having an address system of the parallel binary-coded-decimal type. However, it should be noted that re-arrangement of the logic in the address selector would adapt the invention for use with computers which utilize straight binary address. The address selector 16 includes address input terminals 60–63 connected to the lowest order or units (1, 2, 4, and 8) lines of the computer address system. Also, the address selector includes a series of terminals 64–67 connected to the tens (10, 20, 40, and 80) lines as well as a series of terminals 68–71 connected to the hundreds (100, 200, 400, and 800) address lines. The address of the time input unit of this invention may be "800," for example, and this address would energize the output unit 15. An address of 800 would be a condition where only the terminal 71 is energized and would be associated with a "Read Clock" instruction in the computer program. In a like manner, an address of "810" would energize the input unit 17. The address of 810, representing a situation wherein only the terminals 64 and 71 are energized, would correspond to a "Write Clock" instruction in the program. In the address selector 16, to reject all addresses having a number other than zero in the unit's place, an "or" gate 74 is connected to the terminals 60–63 and is effective to energize an output line 75 when a voltage appears on any one of the terminals 60–63. An "and-not" gate 76 is provided having inputs connected to the terminals 64–67. This gate 76 is adapted to energize an output line 77 only when a voltage appears on the terminal 64 but no voltage appears either on the remaining terminals 65–67 or at an input 78 which is connected to the output line 75 of the gate 74. It will be seen that this arrangement rejects all addresses ending in numbers other than "00" or "10." The address selector also includes an "and-not" gate 81 which is connected to the input terminals 68–71 and is effective to energize an output line 82 only when a condition exists wherein a voltage appears on the terminal 71, but no voltage appears either on any of the terminals 68–70 or at an input 83 which is connected to the output line 75 of the gate 74. Also, the gate 81 will not energize the line 82 when a voltage appears at an input 84 which is connected to the output of an "or" gate 85. The gate 85 is connected to be responsive to the voltages appearing on the input terminals 65–67 and is effective to produce an output when a voltage appears on either of these three inputs. Thus the gate 81 is disabled when the address ends in a number other than "10."

The address selector also includes an "and-not" gate 86 which is effective to energize an output line 87 only when a voltage appears on the ilne 82 and no voltage appears on an input 88 which is connected to the output line 77 of the gate 76. Thus it can be seen that an output appears on the line 87 only when an address of 800 is applied to the computer address lines.

A voltage appearing on the line 87, representing a Read Clock instruction, is applied through a delay circuit 89 to the line 51 in the output unit 15 to enable all of the gates 41–45. The delay circuit 89 introduces a delay of an interval much less than the interval between clock pulses and is necessary to allow any ripple from the pulse storage unit 13 to propagate to the highest order stage of the counting unit 14. A voltage appearing on the line 87 also appears at an input 90 of an "and" gate 91 in the pulse storage unit 13. The gate 91 is effective to produce an output only when a voltage appears at the input 90 and also at an input 92 which is connected to the output of the clock pulse generator 12. The output of the gate 91 is applied to an input 93 of a bistable multivibrator circuit 94 which is of conventional form and is adapted to switch from a state wherein the left-hand side is conducting to one wherein the right-hand side is conducting when a pulse appears at the input 93. The voltage appearing on the output of the left-hand side of the circuit 94 is applied to an input 96 of an "and-not" gate 97. This gate 97 is effective to energize an output line 98 only when a voltage appears at the input 96 but no voltage appears at either a second input 101 or a third input 102. The line 98 is connected to an input 103 of the circuit 94 so that a pulse appearing on the line 98 is effective to switch the circuit 94 to a state wherein the left-hand side is conducting. Also, a pulse appearing on the line 98, being applied to the input 25 of the gate 24, is effective to advance the counting unit 14 by one.

Also included in the address selector 16 is an "and" gate 104 which is adapted to produce a voltage at an output 105 only when inputs appear on both the lines 77 and 106. Thus, when the "and-not" gates 76 and 81 are both enabled, the "and" gate 104 will also be enabled. This occurs only when the Write Clock address appears on the computer address lines. This could be any unused address, but is shown here as the binary-coded-decimal number 810.

When a voltage appears at the output 105, then the line 107 in the input unit 17 is energized. This results in an "and" entry to a series of "and" gates 108–112 and also an "and" entry to a series of "and-not" gates 113–117. These gates 108–112 and 113–117 are adapted to enter the one's complement of a parallel binary number which appears on a series of output lines 120–124 of the computer into a binary register in the binary subtracting unit 18. At the beginning of a program, after a Write Clock instruction, the computer is instructed to apply a number to the output lines 120–124 which represent the lowest order bits of the usual thirty-six bit computer output. The number applied to the lines 120–124 is the desired maximum running time for the program as selected by the operator. When a "1" appears on one of these output lines 120–124, then the appropriate "and" gate in the input unit 17 is enabled and an input appears at the appropriate one of a series of inputs 126–130 which drives the corresponding one of a series of multivibrators 131–135 to its "0" condition. On the other hand, a binary "0" appearing on one of the lines 120–124 enables the appropriate one of the "and-not" gates 113–117 and enters a binary "1" at the appropriate one of a series of inputs 136–140. This results in a binary "1" condition in the corresponding one of the multivibrators 131–135. Thus the one's complement of a number appearing on the lines 120–124 is entered into the serially connected multivibrators 131–135.

When the Write Clock voltage appears on the line 107, it is effective to switch a bistable multivibrator 142 into a condition wherein an output voltage appears on a line 143. This voltage will persist on the line 143 until a voltage is applied to another input 144, and this will not occur until a Read Clock voltage appears at the output 87 of the address selector 16. A voltage appearing on the output 143 is effective to enable an "and" gate 145 in the binary subtracting unit. Also applied to an input 146 of this gate 145 are the clock pulses from the clock pulse generator 12. Thus each clock pulse will be applied to the lowest order stage of the binary register, that is, to the input of the multivibrator 131. The clock pulses will continue to be registered on the multivibrators 131–135 until all of these multivibrators are in the "1" condition. The next pulse will produce a "carry" at an output 147 of the multivibrator 135. This output 147 is connected to an input terminal 148 of the computer and a voltage appearing at this input 148 is effective, with proper programming, to place the computer in a trapping mode for transfer to an exit routine.

The operation of this invention will first be examined at a time when neither of the addresses 800 or 810 appears at the input to the address selector. Here the "and-not" gate 21 is enabled and the clock pulses pass through the "or" gate 24 and are registered on the multivibrators 28–32 in the counting unit 14, accumulating an indication of elapsed time. However, no pulses will be applied to the computer input terminals 52–56 so long as the output unit 15 is not energized.

Assume now that the computer program reaches a Read Clock instruction. An address of 800 would occur at this time and this would be effective to enable the "and-not" gates 81 and 86 in the address selector, but would not enable any of the other gates 74, 76, 85, or 104. Thus a Read Clock voltage would appear on the output 87 of the address selector. This voltage would be effective to close the gate 21 since it appears as a "not" entry at the input 22. However, this Read Clock voltage would be effective to enable the gate 91 as it appears as an "and" entry at the input 90. After a short delay introduced by the delay circuit 89, which allows the latest clock pulse to propagate to the highest order stage in the counting unit 14, then a voltage appears on the line 51 that is effective to enable the "and" gates 41–45 in the output unit. Thus the accumulated time in the register will appear on the computer input lines 52–56. If a clock pulse appears on the input 92 while the "and" gate 91 is enabled, then the multivibrator 94 will be switched to its "1" condition and a voltage will appear at the input 96 of the "and-not" gate 97. This gate 97 will remain closed so long as the Read Clock voltage appears at the input 102. When the Read Clock voltage has ceased, the gate 97 will be enabled, and a pulse appearing at the output 98 will pass through the "or" gate 94 and thereby, entered in the binary register. Also a pulse will appear at the input 103 of the multivibrator 94 to switch it back to its "0" condition. This arrangement in the pulse storage unit is effective to store only one clock pulse while the clock is being read since the period of time necessary to enter the accumulated time into the computer will be much less than the interval between clock pulses.

Assuming now that the Write Clock address appears on the computer address lines, then the "and-not" gates 81 and 76 will both be enabled. The gate 86 will not be enabled due to the "not" entry at the input 88, but the gate 104 will be enabled and the line 107 will be energized in the output unit 17. The computer is programmed to apply the desired running time to the lines 120–124 at the same time that the 810 address appears on the address lines. For example, if the running time is to be 25-thousandths of an hour, then the binary number 11001 will appear on the lines 120–124, the least significant digit being on line 120. This will enable the "and" gate 108, the "and-not" gates 114 and 115 and the "and" gates 111 and 112. This will enter the binary number 00110, which is the one's complement of the number 11001, into the register comprised of the multivibrators 131–135, the least significant digit being on the multivibrator 131. Subsequently, since the Write Clock voltage switches the multivibrator 142 and enables the gate 145, the clock pulses from the generator 12 will be entered into binary register or multivibrators 131–135. After twenty-five of these clock pulses have appeared, the multivibrators 131–135 will all be in the "1" condition. The next pulse will produce a carry at the output line 147 which will be applied to the input 148 of the computer and this may be effective to shift the computer into an exit routine.

After the Write Clock pulse appears on the line 107 to switch the multivibrator 142 to its right-hand conducting condition, but prior to the twenty-sixth clock pulse, the computer may complete the execution of the example program and reach a Read Clock instruction. In this case, a Read Clock voltage appears on the line 87 and on the input 144 which would switch the multivibrator 142 back to its "1" condition. This would dis-enable the "and" gate 145 so that no more clock pulses would reach the binary subtracting unit until after the next Write Clock instruction had cleared the register. Thus it is seen that the program interrupt feature will operate only if a Write Clock instruction occurs prior to the next Read Clock instruction.

Although this invention has been described in terms of an illustrative embodiment, it is of course understood that various modifications may be made by persons skilled in the art. Thus it is contemplated that the appended claims will cover any such modifications as fall within the true scope of the invention.

I claim:

1. In input apparatus for a computing machine, a generator for producing periodic pulses, a first register having an input and an output, the input being connected to said generator to receive and accumulate said pulses to provide a representation thereof, first gating means connecting the output of said first register to first terminal means and effective when energized to allow said representation to appear on said first terminal means, selective address means having input means and having first and second outputs, said address means being responsive to a first code applied to said input means to energize said first output and responsive to a second code applied to said input means to energize said second output, said first output being connected to energize said first gating means, a second register having first and second inputs and an output, an input unit having an input connected to second terminal means and having an output connected to the first input of said second register, said input unit being connected to said second output of said address means to enter a representation of information appearing on said second terminal means into said second register when energized, second gating means connecting said generator to the second input of said second register and effective when energized to allow said pulses to be entered on said second register, and means connecting said second output of said address means to said second gating means whereby said second gating means is energized upon the occurrence of said second code.

2. In input apparatus for a computing machine, a generator to produce pulses spaced at given intervals, a first register having an input and an output, the input being connected to said generator to receive and accumulate said pulses to provide a representation thereof, first gating means connecting the output of said first register to first terminal means and effective when energized to allow said representation to appear on said first terminal means, selective address means having input means and having first and second outputs, said address means being responsive to a first coded signal applied to said input means to energize said first output and responsive to a second coded signal applied to said input means to energize said second output, said first output being connected to energize said first gating means, pulse storage means connected to said generator to receive said pulses, said storage means being coupled to said first output to store said pulses when energized and to apply stored pulses to said input of said first register when de-energized, a second register having first and second inputs and an output, an input unit having an input connected to second terminal means and having an output connected to the first input of said second register, said input unit being connected to said second output of said address means to enter a representation of information appearing on said second terminal means into said second register when said second output is energized, second gating means connecting said generator to the second input of said second register and effective when energized to allow said clock pulses to be entered on said second register, and means connecting said second output of said address means to said second gating means whereby said second gating means will be energized upon the occurrence of said second coded signal.

3. In on-line input apparatus for providing time information to a computing machine, a generator to produce clock pulses spaced at given time intervals, a first register having an input and an output, the input being connected to said generator to receive and accumulate said clock pulses to provide a representation of the number of clock pulses which have occurred, first gating means connecting the output of said first register to first terminal means and effective when energized to allow said representation to appear on said first terminal means, selective address means having input means and having first and second outputs, said address means being responsive to a first coded signal applied to said input means to energize said first output and responsive to a second coded signal applied to said input means to energize said second output, said first output being connected to energize said first gating means, pulse storage means connected to said generator to receive said clock pulses, said storage means being coupled to said first output to store said clock pulses when energized and to apply stored pulses to said input of said first register when de-energized, a second register having first and second inputs and an output, an input unit having an input connected to second terminal means and having an output connected to the first input of said second register, said input unit being connected to said second output of said address means to enter the complement of any number appearing on said second terminal means into said second register when said second output is energized, second gating means connecting said generator to the second input of said second register and effective when energized to allow said clock pulses to be entered on said second register, a bistable switch having an output connected to said second gating means and having first and second inputs connected to said first and second outputs respectively of said address means, said switch being responsive to the energization of the second output of said address means to energize said second gating means, and coupling means connecting the output of said second register to third terminal means whereby said third terminal means will be energized after the occurrence of a number of clock pulses related to the number entered into said second register from said second terminal means.

4. In input apparatus for use with a computing machine of the type having parallel binary input and output lines and parallel address lines, a generator to produce clock pulses spaced at predetermined time intervals, a first binary register having an input and an output, the input being connected to said generator to receive and accumulate said clock pulses to provide a parallel binary representation of the number of clock pulses which have occurred, gating means connecting the output of said binary register to said parallel input lines and effective when energized to allow said binary representation to appear on said input lines, an address selector having an input connected to said address lines and having first and second outputs, said address selector being responsive to a first address appearing on the address lines to energize said first output and responsive to a second address appearing on the address lines to energize said second output, means connecting said first output of said address selector to energize said gating means, pulse storage means connected to receive said clock pulses and effective when energized to store said clock pulses and effective when de-energized to apply stored clock pulses to said input of said first binary register, a second binary register, an input unit connecting said output lines of said computing machine to said second binary register to enter the one's complement of a number appearing on said output lines into said second register when said input unit is energized, said input unit being connected to said second output of said address selector to be energized thereby, bistable gating means connecting said clock pulse generator to said second register, coupling means connecting said first and second outputs of said address selector to said bistable gating means, said bistable gating means being opened when said second output is energized and adapted to remain open until said first output is energized, and means connecting the highest order stage of said second register to an output terminal whereby said output terminal will be energized when sufficient clock pulses have been applied to said second register to produce a carry at said highest order stage.

5. In input apparatus for use with a computing machine of the type having parallel binary input and output lines and parallel address lines, a generator to produce clock pulses spaced at predetermined time intervals, a first binary register having an input and an output, the input being connected to said generator to receive and accumulate said clock pulses to provide a parallel binary representation of the number of clock pulses which have occurred, gating means connecting the output of said binary register to said parallel input lines and effective when energized to allow said binary representation to appear on said input lines, an address selector having an input connected to said address lines and having first and second outputs, said address selector being responsive to a first address appearing on the address lines to energize said first output and being responsive to a second address appearing on the address lines to energize said second output, means connecting said first output of said address selector to energize said gating means, pulse storage means connected to receive said clock pulses and effective when activated to store said clock pulses and when de-activated to apply stored clock pulses to said input of said first binary register, a second binary register having an input connected to said generator, an input unit connecting said output lines of said computing machine to said second binary register to enter the one's complement of the number appearing on said output lines into said second register when said input unit is energized, said input unit being connected to said second output of said address selector to be energized thereby, and means connecting the output of said second binary register to a program interrupt input of the computing machine.

6. In input apparatus for use with a computing machine of the type having parallel binary input and output lines and parallel address lines, a generator to produce clock pulses spaced at predetermined time intervals, a first binary register having an input and an output, said input being connected to said generator to receive and accumulate said clock pulses to provide a parallel binary representation of the number of clock pulses which have occurred, gating means connecting the output of said binary register to said parallel input lines and effective when energized to allow said binary representation to appear on said input lines, an address selector having an input connected to said address lines and having first and second outputs, said address selector being responsive to a first address appearing on the address lines to energize said first output and being responsive to a second address appearing on the address lines to energize said second output, means connecting said first output of said address selector to energize said gating means, a second binary register having an input connected to said generator, an input unit connecting said output lines of said computing machine to said second binary register to enter a binary number corresponding to the number appearing on said output lines of said computing machine into said second register when said input unit is energized, said input unit being connected to said second output of said address selector to be energized thereby, and means connecting the highest order stage of said second binary register to an output terminal whereby said output terminal is energized when a carry is produced by said highest order stage.

7. In input apparatus for use with a computing machine of the type having parallel input and output lines and parallel address lines, a generator to produce clock pulses spaced at predetermined time intervals, a first register having an input and an output, the input being connected to said generator to receive and accumulate said clock pulses to provide a parallel representation of the number of clock pulses which have occurred, gating means connecting the output of said first register to said parallel input lines and effective when energized to allow said representation to appear on said input lines, an address selector having an input connected to said address lines and having first and second outputs, said address selector being responsive to a first address appearing on the address lines to energize said first output and being responsive to a second address appearing on the address lines to energize said second output, means connecting said first output of said address selector to energize said gating means, a second register having an input connected to said generator, an input unit connecting said output lines of said computing machine to said second register to enter the complement of the number appearing on said output lines into said second register when said input unit is energized, said input unit being connected to said second output of said address selector to be energized thereby, and means connecting the output of said second register to a program interrupt input of the computing machine.

References Cited in the file of this patent

UNITED STATES PATENTS 2,815,168 Zukin ------------------ Dec. 3, 1957